(12) United States Patent
Cordourier Maruri et al.

(10) Patent No.: US 10,847,173 B2
(45) Date of Patent: Nov. 24, 2020

(54) SELECTION BETWEEN SIGNAL SOURCES BASED UPON CALCULATED SIGNAL TO NOISE RATIO

(71) Applicant: Intel Corporation, Santa Clara, CA (US)

(72) Inventors: Hector Alfonso Cordourier Maruri, Guadalajara (MX); Jonathan Huang, Pleasanton, CA (US); Paulo Lopez Meyer, Zapopan (MX); Willem Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 15/952,177

(22) Filed: Apr. 12, 2018

(65) Prior Publication Data

US 2019/0043517 A1 Feb. 7, 2019

Related U.S. Application Data

(60) Provisional application No. 62/630,745, filed on Feb. 14, 2018, provisional application No. 62/629,700, filed on Feb. 13, 2018.

(51) Int. Cl.
*G10L 25/30* (2013.01)
*G10L 25/18* (2013.01)
(Continued)

(52) U.S. Cl.
CPC ............ *G10L 25/30* (2013.01); *G02B 27/017* (2013.01); *G10L 21/0216* (2013.01);
(Continued)

(58) Field of Classification Search
CPC ......... G10L 25/30; G10L 25/18; G10L 25/21; G10L 21/0216; G10L 15/00;
(Continued)

(56) References Cited

U.S. PATENT DOCUMENTS

2011/0288860 A1* 11/2011 Schevciw ............... G10L 25/78
704/233
2014/0363020 A1* 12/2014 Endo ........................ H04R 1/08
381/98

(Continued)

FOREIGN PATENT DOCUMENTS

WO     WO 2018/057202 A1     3/2018

*Primary Examiner* — Ahmad F. Matar
*Assistant Examiner* — Sabrina Diaz
(74) *Attorney, Agent, or Firm* — Schwabe, Williamson & Wyatt, P.C.

(57) ABSTRACT

Apparatuses and methods for selecting, for communicating, between signals provided by various pickups on the basis of a calculated signal to noise ratio (SNR) are disclosed. The various pickups may include a microphone and a vibration sensor. Signals from the microphone may be compared with signals from the vibration sensor by extracting a root-mean-square (RMS) profile for each, and comparing the RMS profiles to determine an SNR estimate for the microphone signal. The microphone signal may be selected if the SNR estimate is below a predetermined threshold, otherwise the vibration sensor signal may be selected. The vibration sensor signal may be subject to further processing if selected to approximate the microphone signal.

26 Claims, 6 Drawing Sheets

(51) Int. Cl.
  *G10L 25/21*     (2013.01)
  *H04R 25/00*     (2006.01)
  *G02B 27/01*     (2006.01)
  *G10L 21/0216*   (2013.01)
  *H04R 1/46*      (2006.01)
  *H04R 3/00*      (2006.01)
  *H04R 5/027*     (2006.01)
  *G10L 15/00*     (2013.01)

(52) U.S. Cl.
  CPC .............. *G10L 25/18* (2013.01); *G10L 25/21* (2013.01); *H04R 1/46* (2013.01); *H04R 3/005* (2013.01); *H04R 5/027* (2013.01); *H04R 25/507* (2013.01); *G10L 15/00* (2013.01); *H04R 2410/05* (2013.01)

(58) Field of Classification Search
  CPC ...... G02B 27/017; H04R 1/46; H04R 1/1083; H04R 3/005; H04R 5/027; H04R 25/507; H04R 2410/05; G10K 11/1788; G10K 11/178; G10K 11/1784; G10K 2201/1081; G10K 2201/1291; G10K 2201/129; G10K 2201/501; F16F 15/02
  USPC .............................................. 381/71.1, 71.2
  See application file for complete search history.

(56) References Cited

U.S. PATENT DOCUMENTS

| | | | |
|---|---|---|---|
| 2015/0161998 A1* | 6/2015 | Park ..................... | G10L 25/78 704/231 |
| 2018/0084341 A1 | 3/2018 | Cordourier Maruri et al. | |
| 2018/0090153 A1* | 3/2018 | Hoshuyama ............. | H04R 3/00 |

* cited by examiner

100
SELECTION BETWEEN SIGNAL SOURCES BASED UPON CALCULATED SIGNAL TO NOISE RATIO

CROSS-REFERENCE TO RELATED APPLICATIONS

The present application claims priority to the U.S. Provisional application No. 62/630,745 filed on Feb. 14, 2018, and U.S. Provisional application No. 62/629,700 filed on Feb. 13, 2018, the disclosures of which are incorporated herein in their entireties and for all purposes.

TECHNICAL FIELD

Embodiments of the present disclosure generally relate to the fields of speech recognition and wearable devices, and more particularly, to wearable devices configured to switch between a signal from a vibration sensor and a signal from a microphone depending upon a signal-to-noise ratio calculated based on the signals.

BACKGROUND

Audio sensors, such as microphones, have been employed to capture a device user's voice through air propagation for automatic speech recognition (ASR), among other uses. Other audio sensors, such as vibration sensors, have been employed to capture a device user's voice via physical contact with the user. Portable or wearable electronic devices (hereinafter simply, wearable devices), including head wearable devices, continue to increase in popularity, and feature increasingly sophisticated functionality. Wearable devices may include one or more audio sensors to receive voice input for a variety of functions, such as human-to-human communication, voice command control, or interacting with a virtual assistant. Various functions may require accurate input from an ASR routine. The accuracy of an ASR routine may depend upon the type and quality of input from a given wearable device's audio sensors.

Wearable devices may be equipped with multiple audio sensors of varying types, including the aforementioned microphones as well as vibration sensors. Vibration sensors may include nasal bridge pickups that use piezoelectric sensors to detect vibrations in a user's head generated while the user speaks, as well as feedback from vibration motors (such as may be found in many devices to provide haptic feedback) that may be actuated by speech vibrations. The characteristics and quality of signal received from an audio sensor may depend upon the type of sensor.

DESCRIPTION OF EMBODIMENTS

Currently, most head-worn smart devices (aka "wearables"), such as smart glasses, may be equipped with one or more regular microphones, and may also be equipped with signal processing-based de-noising routines. Microphone-only signal processing de-noising solutions often impose a computational cost, which can adversely affect both the battery life of an implementing device, and may reduce overall system performance, as at least a portion of the device's resources must be allocated for de-noising. Such routines often have an uneven performance depending on the background noise type. For example, it can be difficult to filter the voice of a user of the device from other surrounding, interfering human voices, and/or other background noise. If background noise is exceptionally high compared to the user's voice, it may be impossible to obtain a usable signal from the microphone.

An alternative to a microphone pickup is a vibration sensing pickup, such as a nasal bridge pickup, that detects vibrations through a user's skull (or other body part) that are generated when the user speaks. Because such vibration sensors detect audio by contact with the user, the signal from a vibration sensor typically has a very high signal to noise ratio (SNR) compared to a microphone. For purposes of this application and in the interest of clarity, a "high" SNR is preferable to a "low" SNR. A high SNR is realized where the relative strength of a desired signal, e.g. the user's voice, is substantially greater than undesired background or ambient noise, while a low SNR is realized when the strength of undesired background or ambient noise is much closer or substantially similar to the strength of a desired signal. It will be appreciated by a person skilled in the relevant art that a sufficiently low SNR may make extracting the desired signal from background or ambient sound problematic, if not impossible.

Vibration sensors may offer a high SNR even in high noise environments, as the human body tends to be a poor conductor of ambient noise. However, due to the nature of how such pickups sense audio, wearable devices that only use bone conducting sensors usually have poor ASR performance from an unprocessed signal from the vibration sensor. Performance can generally be improved to an acceptable level by use of digital signal processing. However, as with a de-noising routine for a microphone, such digital signal processing can be computationally expensive, and may adversely impact battery life and/or device performance. Even with this overhead, however, a vibration sensing pickup can enable device functionality in environments too noisy for a microphone pickup to provide an acceptable signal, even with extensive de-noising.

It will be recognized, then, that in relatively quiet scenarios, a microphone pickup may be preferable to use with ASR routines, due to its relative lack of distortion and natural capture of speech. However, in noisy environments, a vibration sensor pickup may be preferred (or even necessary in sufficiently noisy environments) due to its comparatively high SNR, but will nevertheless result in a degraded word error rate (WER) that some users may consider unacceptable without processing and transformation. A solution to this problem is to equip a wearable device with both a microphone and a vibration sensing pickup, then toggle between each pickup based upon the SNR measured from at least the microphone pickup. Where the environment is sufficiently quiet, the microphone will generally be used, but when the SNR exceeds a predetermined threshold, the vibration sensor instead may be employed, typically with some processing to provide an acceptable WER.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment" or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
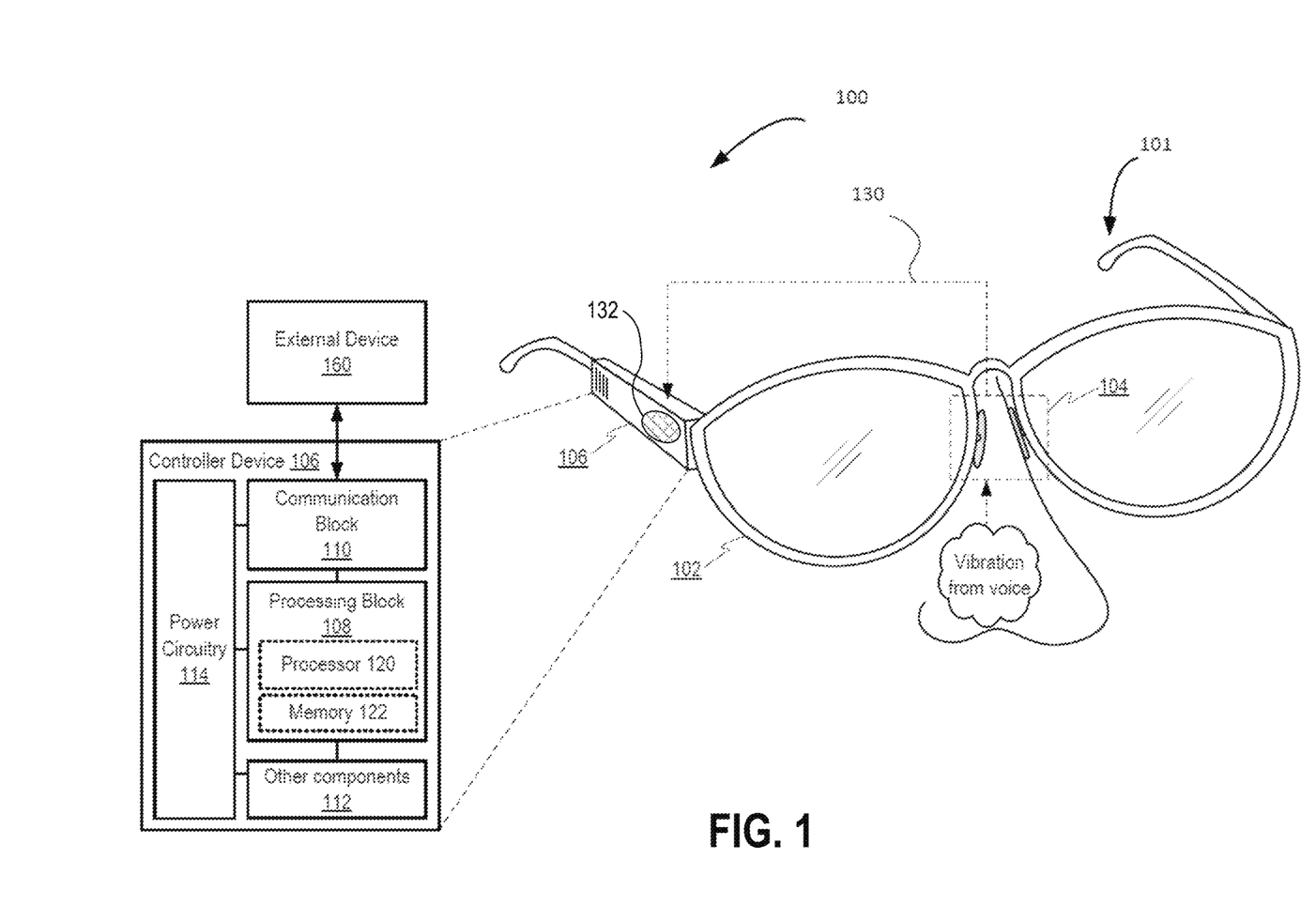
FIG. 1 is a diagram illustrating an example wearable apparatus that includes a vibration sensor and microphone, in accordance with some embodiments.

FIG. 1 is a diagram illustrating an example apparatus for transformation of a signal generated by a vibration sensor pickup in response to vibration induced by a user's voice in a portion of a user's head into an audio signal that approximates the signal that would be obtained if a microphone pickup were used, in accordance with some embodiments. The apparatus 100 may comprise a wearable device, to be worn on or around a user's head. The audio signal may be provided by vibration sensors disposed in the apparatus 100, in response to vibrations caused by the user's voice in the user's head bones (e.g., nasal bones). This vibration signal, if used in speech recognition or direct voice reproduction, may not always represent the user's voice with desired quality, and where used with an ASR routine, may result in an unacceptably high WER. The apparatus 100 may be configured to transform the vibration sensor signal into an audio signal that emulates a microphone signal, which may be used for reproduction of the user's voice or further processing by an ASR system to achieve an acceptable WER.

Example implementations of the apparatus 100 may include eyeglasses, helmets, headsets, diadems, caps, hats, or other types of headwear. While examples of specific implementations (e.g., in eyeglasses) and/or technologies (e.g., piezoelectric sensors, wireless communications, etc.) may be employed herein, these examples are presented merely to provide a readily comprehensible perspective from which the more generalized devices, methods, etc. described herein may be understood.

As noted above, the apparatus 100 may comprise a wearable device, such as eyeglasses 101, in the example illustrated in FIG. 1. The apparatus 100 may include a frame 102 of eyeglasses 101. The frame 102 is described herein as a part of the apparatus 100 (in this example, eyeglasses 101) for the sake of explanation. Other applications or configurations of an apparatus 100 may result in implementations that remain consistent with the teachings presented herein.

One or more sensors 104 and 132 for picking up an audio signal may be disposed on the apparatus 100, such as on the frame 102, as shown in FIG. 1. For ease of explanation, the term "sensor" is used herein to describe at least one sensor, e.g., one, two, or more sensors that may be disposed on the apparatus 100. The sensors 104 and 132 may be mounted on the frame 102 via mechanical attachment (e.g., screw, nail or other fastener), adhesive attachment (e.g., a glue, epoxy, etc.) or may be incorporated within the structure of the frame 102. In embodiments, the sensor 104 may comprise vibration sensing circuitry. The sensing circuitry may comprise, for example, piezoelectric components such as a diaphragm or other piezoelectric transducer, to convert vibration (e.g., mechanical pressure waves) occurring in portions of the user's head into signals. In some embodiments, the sensing circuitry may comprise any type of sensors responsive to vibration, such as, for example, microelectromechanical systems (MEMS) accelerometer or the like. In still other embodiments, the sensing circuitry may comprise a vibration motor of a mobile device which may be configured to also/alternatively act as a vibration-sensitive pickup.

Similarly, sensor 132 may comprise a microphone. The microphone may comprise a condenser, dynamic, diaphragm, ribbon, or any other technology or type suitable for implementing a microphone pickup. While FIG. 1 depicts a single sensor 132, embodiments of apparatus 100 may include a plurality of sensors 132. For example, some embodiments of apparatus 100 may include a sensor 132 on each side of frame 102, so as to provide a stereoscopic pick-up. Other embodiments may implement sensor 132 as an array of sensors, so as to provide better directional pick up of audio by way of beam forming or shaping, or to employ noise cancellation and/or reduction of background noise in subsequent processing. Sensor 132 may be placed in other locations on apparatus 100 that are suitable to picking up desired audio, such as the voice of a user of apparatus 100. Still other embodiments may place sensor 132 separate from apparatus 100, e.g. an external microphone such as may be found on a pair of headphones or Bluetooth headset, lapel microphone, or other suitable placement.

As shown, the sensor 104 may be disposed on the frame 102 to be in contact with, or at least proximate to, the nose of a user wearing the apparatus 100. The bridge of the user's nose may resonate in response to the user's voice. The sensor 104 may be able to detect vibration caused by the nasal bones resonating with the user's voice, and may convert the sensed vibration into a signal 130, e.g., an electronic signal, to be processed as described below.

The embodiments of this disclosure are not limited to nasal vibration detection described above and are described herein for ease of understanding. Other types of vibration indicative of the user's voice may be sensed in different portions of the user's head, such as, for example, temples, forehead, or other portions of the user's head, for example, in the upper portion of the user's head.

The apparatus 100 may further include a controller device 106, which in some embodiments may also be disposed on the apparatus 100 (e.g., the frame 102) as shown. The controller device 106 may be electrically and/or communicatively coupled with sensors 104 and 132, so as to receive a signal from sensor 132 (shown as directly attached to controller device 106) and receive and process the signal 130 provided by the sensor 104. Controller device 106 may use the signal from sensor 132 to aid in transforming the signal 130 from sensor 104 into an emulated audio signal that approximates the signal obtained from sensor 132, with distortions associated with the vibration in the user's head portion that may be manifested in the generated sensor signal at least partially mitigated. The use of the signal from sensor 132 in aiding in transforming signal 130 will be discussed in greater detail herein.

The controller device 106 may comprise, for example, a processing block 108, to process the signal 130 and generate an emulated audio signal, and communication block 110 to transmit the signal to an external device 160 for further processing, e.g., using a speech recognition technique, such as ASR. The processing block 108 may comprise at least a processor 120 and memory 122. The processing block 108 may include components configured to record and process the readings of the signal 130. The processing block 108 may provide these components through, for example, a plurality of machine-readable instructions stored in the memory 122 and executable on the processor 120. The controller device 106 may record the signal 130 and store (e.g., buffer) the recorded readings, for example, in the memory 122, for further analysis and processing, e.g., in real time or near-real time.

The processor 120 may include, for example, one or more processors situated in separate components, or alternatively one or more processing cores embodied in a component (e.g., in a System-on-a-Chip (SoC) configuration), and any processor-related support circuitry (e.g., bridging interfaces, etc.). Example processors may include, but are not limited to, various microprocessors such as general-purpose processors that may be used for general-purpose computing, and/or microprocessors that are purpose-built, such as specifically for processing of digital signals, and more specifically for processing of digital audio signals. Examples may include processors of the iAPX family, ARM family, MIPS family, SPARC family, PA-RISC family, POWER family, or any other suitable processor architecture now known or later developed. Still other embodiments may use an application-specific integrated circuit (ASIC) or field-programmable gate array (FPGA), which may be customized to transform signal 130 to approximate a microphone signal, or may employ discrete circuitry, including discrete logic circuits.

Examples of support circuitry may include host side or input/output (I/O) side chipsets (also known as northbridge and southbridge chipsets/components for Intel® architecture) to provide an interface through which the processor 120 may interact with other system components that may be operating at different speeds, on different buses, etc. in device 106. Some or all of the functionality commonly associated with the support circuitry may also be included in the same physical package as the processor.

The memory 122 may comprise random access memory (RAM) or read-only memory (ROM) in a fixed or removable format. RAM may include volatile memory configured to hold information during the operation of device 106 such as, for example, static RAM (SRAM) or Dynamic RAM (DRAM). ROM may include non-volatile (NV) memory circuitry configured based on basic input/output system (BIOS), Unified Extensible Firmware Interface (UEFI), etc. to provide instructions when device 106 is activated, programmable memories such as electronic programmable ROMs (erasable programmable read-only memory), Flash, etc. Other fixed/removable memory may include, but is not limited to, electronic memories such as solid state flash memory, removable memory cards or sticks, etc.

The communication block 110 may be communicatively coupled with external device 160 and may include one or more radios capable of transmitting and receiving signals using various suitable wireless communications techniques. Such techniques may involve communications across one or more wireless networks. Some example wireless networks include (but are not limited to) wireless local area networks (WLANs), wireless personal area networks (WPANs), wireless metropolitan area network (WMANs), cellular networks, and satellite networks. In communicating across such networks, the communication block 110 may operate in accordance with one or more applicable standards in any version. To this end, the communication block 110 may include, for instance, hardware, circuits, software, or any combination thereof that allows communication with external computer systems.

In some specific non-limiting examples, the communication block 110 may comport with the Institute of Electrical and Electronics Engineers (IEEE) 802.11 standard (e.g., Wi-Fi), a Bluetooth®, ZigBee®, near-field communication, or any other suitable wireless communication standard. In addition, the communication block 110 may comport with cellular standards such as 3G (e.g., Evolution-Data Optimized (EV-DO), Wideband Code Division Multiple Access (W-CDMA)) and/or 4G wireless standards (e.g., High Speed Packet Access (HSPA), Worldwide Interoperability for Microwave Access (WIMAX), Long-Term Evolution (LTE)).

The apparatus 100 may further include a power circuitry block 114 configured to provide power supply to the components of the controller device 106. In some embodiments, the power circuitry block 114 may be configured to power on the controller device 106 continuously or periodically, in order to save battery power. In some embodiments, the power circuitry block 114 may be configured to power on the controller device 106 on a "wake-up" basis, e.g., in response to vibration detection by the sensor 104. The power circuitry block 114 may include internal power sources (e.g., battery, fuel cell, etc.) and/or external power sources (e.g., power grid, electromechanical or solar generator, external fuel cell, etc.) and related circuitry configured to supply device 106 with the power needed to operate.

The controller device 106 may include other components 112 that may be necessary for functioning of the apparatus 100. Other components 112 may include, for example, hardware and/or software to allow users to interact with the controller device 106 such as, for example, various input mechanisms (e.g., microphones, switches, buttons, knobs, keyboards, speakers, touch-sensitive surfaces, one or more sensors configured to capture images and/or sense proximity, distance, motion, gestures, orientation, biometric data, etc.) and various output mechanisms (e.g., speakers, displays, lighted/flashing indicators, electromechanical components for vibration, motion, etc.). The hardware in other components 112 may be incorporated within the controller device 106 and/or may be external to the device 106 and coupled to device 106 via a wired or wireless communication medium.

Figure 2:
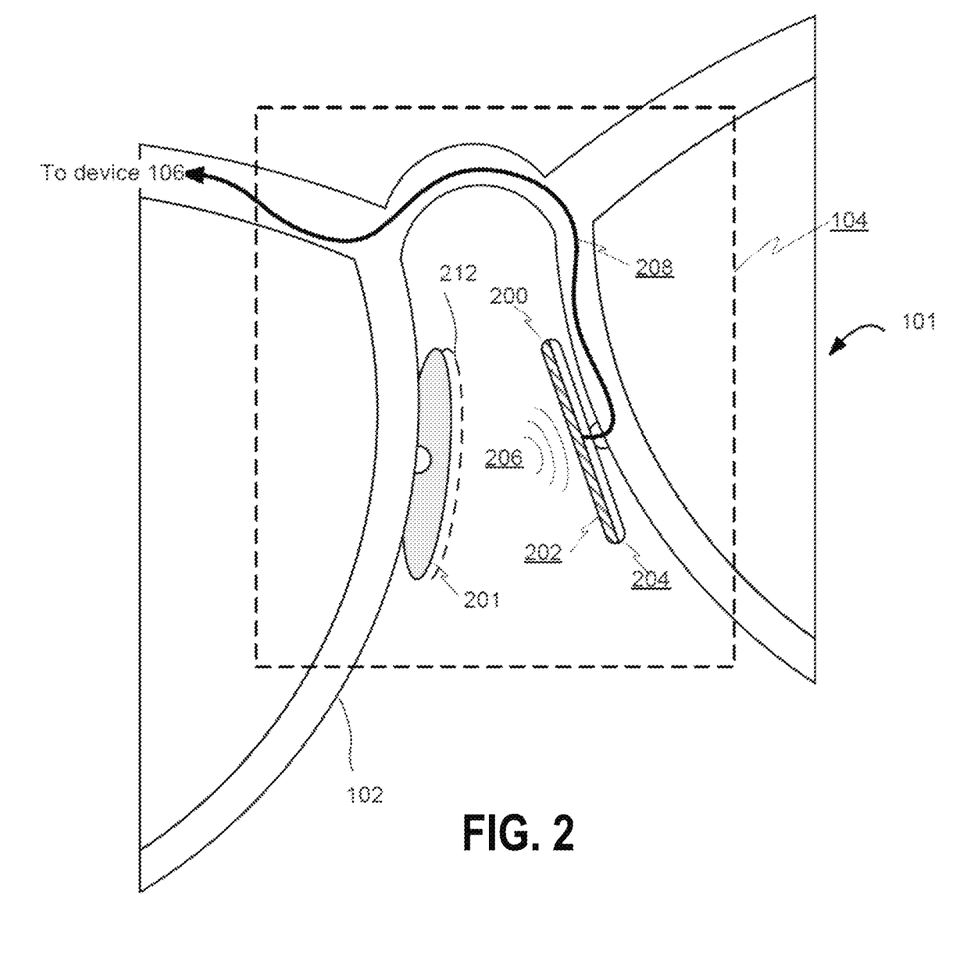
FIG. 2 illustrates an example configuration of the apparatus of FIG. 1, in accordance with some embodiments.

FIG. 2 illustrates an example configuration of the apparatus of FIG. 1, in accordance with some embodiments. More specifically, FIG. 2 illustrates an example disposition of the sensing circuitry in the frame 102 of the apparatus 100. For ease of understanding, like elements of FIGS. 1 and 2 are indicated by like numerals. As shown, the sensor 104 may be disposed within a nosepiece 200 of the frame 102. The sensor 104 may comprise, for example, sensing circuitry (e.g., piezoelectric transducer) 202 affixed or removably attached to structural support 204 of the nosepiece 200 of the frame 102. The sensing circuitry 202 may include, for example, a piezoelectric diaphragm to convert vibration 206 into a signal. Vibration 206 may occur due to the user's nasal bones (not shown) that may resonate in response to the user's voice. The piezoelectric diaphragm comprising the sensing circuitry 202 may be able to accurately generate a signal indicative of the nasal bones' vibration caused by the user's voice and may not require external power, because the pressure waves may compress a piezoelectric crystal of the diaphragm to generate the electronic signal.

The eyeglasses 101 may further include a wire 208 to convey the signal from the sensor 104 to the controller device 106. The wire 208 is shown for illustration purposes; the use of wireless communication may also be possible to transmit the signal to the controller device 106. Similarly, microphone sensor 132 may communicate with controller device 106 either wirelessly or via a wire.

A variety of sensor configurations may be implemented consistent with the present disclosure. For example, given that two nosepieces 200 and 201 may exist in a common pair of glasses, at least one of the two nosepieces 200, 201 may include the sensor 104. In another example implementation, both nosepieces 200 and 201 may include sensing circuitries 202 and 212 (shown in dashed lines), comprising the sensor 104. For example, the circuitries 202 and 212 disposed in each nosepiece 200 may be wired in series to generate stronger signals. In another embodiment, the circuitries 202, 212 in the nosepieces 200, 201 may be wired individually, and the controller device 106 (e.g., processing block 108) may select the sensor circuitry 202 or 212 of the sensor 104 to employ based on the strength of the electronic signals received from each sensor circuitry. In this manner, the apparatus 100 may be able to account for the particularities in each user's nasal bones (e.g., breaks, natural deformities such as a deviated septum, etc.) and select the particular sensor circuitry that may provide the strongest and cleanest signal.

In some embodiments, the apparatus may comprise a wearable device other than eyeglasses, for example a hat, a headset, a helmet, or other type of headwear. The vibration sensor (or sensors) may be disposed in different areas of the wearable device, in order to sense vibration of the user's head bones in response to the user's voice. In general, the sensors may be disposed such as to provide a contact (e.g., direct contact or proximity contact) between the sensors and an upper portion of the user's head in response to application of the wearable device to the user's head. For example, the sensors may be disposed in a head-fitting area of a respective wearable device in order to provide the contact between the sensors and the temples or forehead of the user, to conduct sensing of the respective bone vibration in response to the user's voice. In general, any headwear or form factors that may provide for contact of a sensor with an upper portion of the user's head may be used with embodiments described herein.

Figure 3:
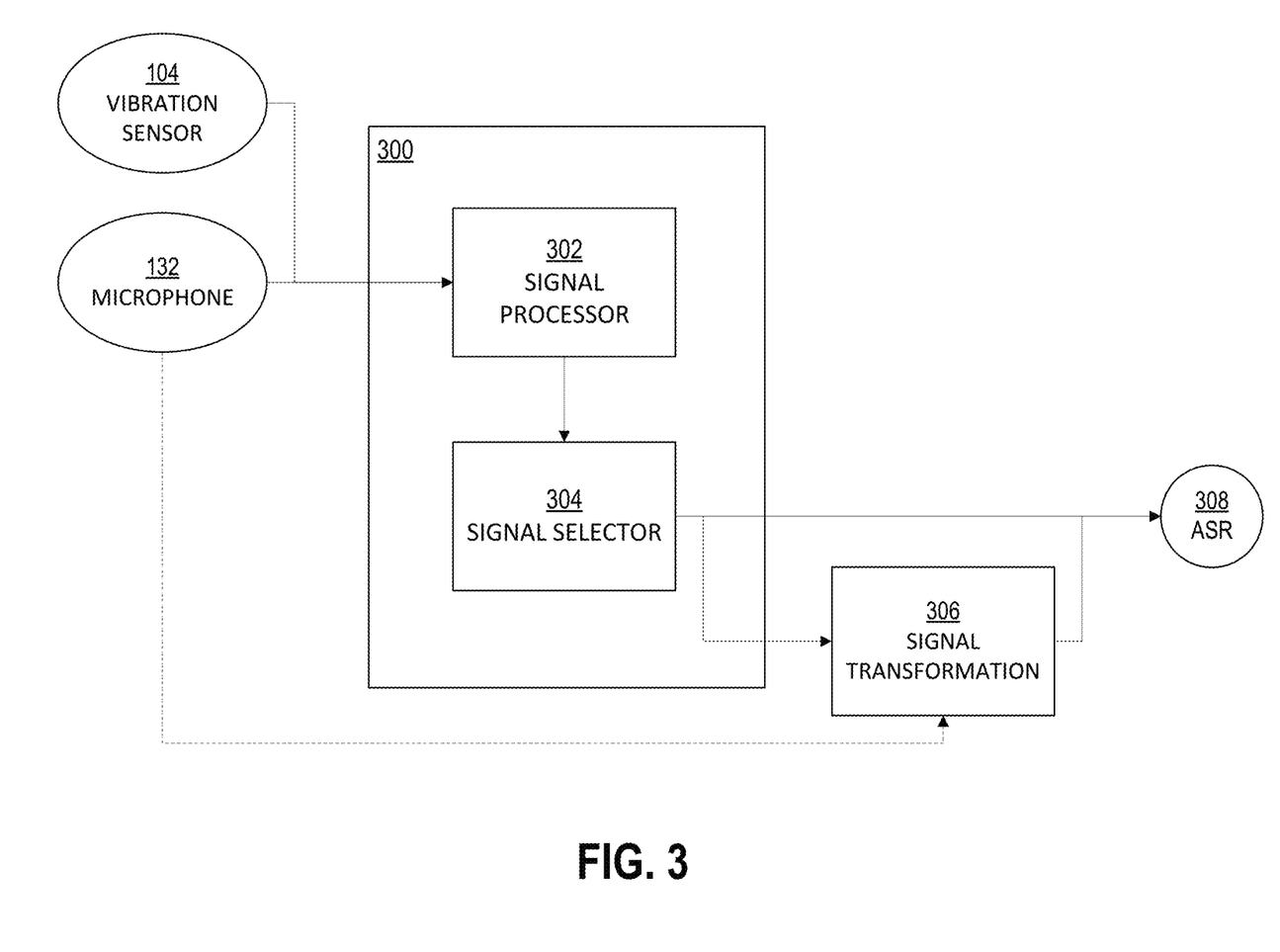
FIG. 3 is a block diagram of an apparatus for selecting between signals from a vibration sensor and microphone that may be implemented by or with the apparatus of FIG. 1, according to some embodiments.

Referring to FIG. 3, apparatus 300 may include a signal processor 302 in communication with a signal selector 304. In some embodiments, apparatus 300 may be implemented as a standalone device, or, in other embodiments, may be a part of apparatus 100, as a part of controller 106. In still other embodiments, apparatus 300 may be a part of processing block 108. Depending on the embodiment, apparatus 300 may be implemented using one or more computer readable medium/media (CRM), which may execute upon a processor such as found in controller 106, for example. Embodiments may implement apparatus 300 using one or more discrete components, application-specific integrated circuits (ASICs), field-programmable gate arrays (FPGAs), or any other suitable technology now known or later developed.

Signal processor 302 of apparatus 300 may calculate a signal to noise ratio (SNR) for a signal received from a microphone 132, using the microphone signal and a signal 130 received from a vibration sensor 104. The calculated SNR may then be provided to a selector 304 to select between the microphone signal and the vibration sensor signal for communication. The selector 304 may select the microphone signal in response to the SNR being below a predetermined threshold, and select the vibration sensor signal in response to the SNR being at or above the predetermined threshold. The selected signal may then be provided for communication, such as to an automatic speech recognition (ASR) module 308, which can then use recognized speech for further processing. Alternatively or additionally, the selected signal may be used for person to person communication, such as over a wireless voice session, e.g. cell phone or voice over IP (VoIP) communications. ASR module 308 is only one possible destination or usage of the selected signal. Moreover, ASR module 308 (or another usage) may not be a part of apparatus 300. While some embodiments may perform further processing of the selected signal locally, some embodiments may transmit the selected signal to a cloud service or other external device to perform ASR or other desired operations.

In some embodiments, where signal selector 304 selects the signal from vibration sensor 104, the signal 130 may be passed through a signal transformation 306 before being used for further communications. Vibration sensors may provide an audio signal that is distorted compared to a signal from a microphone, and this distortion may adversely affect ASR (lower WER), or may make the user's voice difficult to understand in person to person communications. Signal transformation 306 may process vibration sensor signal 130 to better approximate the signal characteristics of a microphone, potentially improving (lowering) the WER for ASR module 308.

Figure 4:
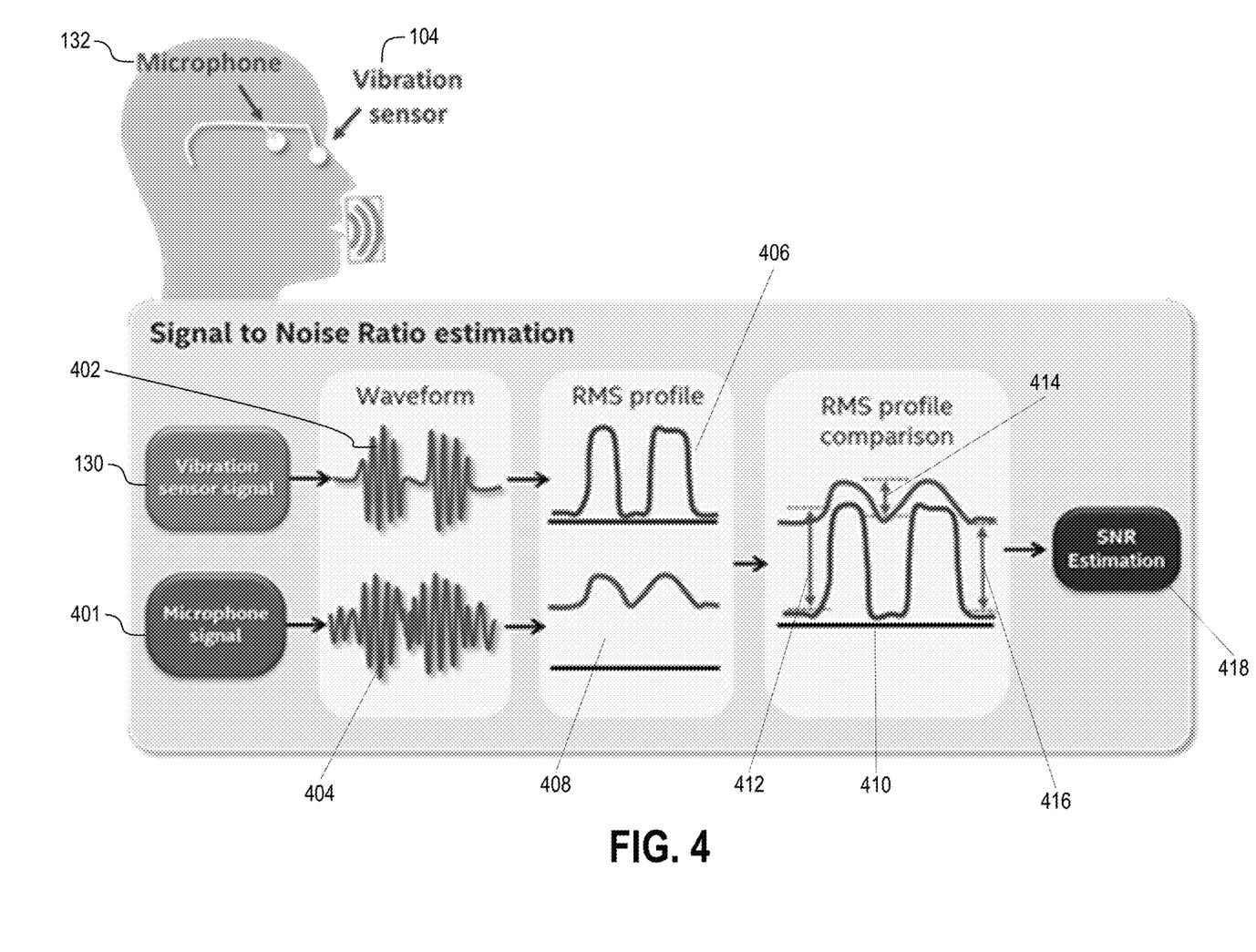
FIG. 4 illustrates a process the apparatus of FIG. 3 may employ for estimating the signal to noise ratio (SNR) of a microphone signal, according to some embodiments.

With reference to FIG. 4, signal processor 302 may calculate the SNR by calculating a root-mean-square (RMS) profile for each of the microphone signal 401 and the vibration sensor signal 130. As described in detail below, signal processor 302 may compare the RMS profile from the microphone signal 401 with the RMS profile from the vibration sensor signal 130 to determine voice activity. As described above, signal 130 is provided by vibration sensor 104; microphone signal 401 is provided by microphone sensor 132.

Signal processor 302 may obtain a waveform 402 from vibration sensor signal 130, and a waveform 404 from microphone signal 401. From waveforms 402 and 404, signal processor 302 may extract RMS profiles 406 and 408, respectively. As can be seen in FIG. 4, each RMS profile can be defined with reference to a floor 410, floor 410 being a zero-noise level or zero signal reference. Vibration sensor RMS profile 406 has a high SNR, indicated by height 412, while microphone RMS profile 408, obtained in a relatively noisy environment, has a low SNR, reflected by comparatively low height 414. Each height 412 and 414 is defined as the difference in signal strength between periods of signal presence (e.g. the user is speaking), and signal absence (e.g. only ambient noise is picked up). Both signals are depicted with reference to floor 410. The height of periods of signal absence above floor 410 reflects the amount of ambient or background noise being registered by a given pickup. The given height at any time of an RMS profile may be correlated with a WER for a given ASR routine, as the height reflects the corresponding signal's SNR. As discussed above, for a given ASR routine, generally lower SNRs result in higher WERs. It should be understood that floor 410 itself is not necessarily measured by apparatus 300; rather, it is shown in FIG. 4 for illustrative purposes only.

In a noisy environment, it can be observed that RMS profile 406 has a high difference between signal presence and signal absence; moreover, periods of signal absence are shown as very close to floor 410. This may be expected from vibration sensor signal 130, as vibration sensors, as noted above, may have high SNR with good noise rejection. Conversely, RMS profile 408, from microphone signal 401, has a comparatively low height 414. In RMS profile 408 periods of signal absence are significantly higher above floor 410, indicating a significant amount of ambient noise is being picked up by microphone 132. The SNR of signal 130 compared over the SNR of signal 401 is indicated in the difference between ambient noise levels illustrated by height 416. Height 416 can be used to supply an SNR estimation 418. Where height 416 is relatively low (close to zero), it may be determined that there is little ambient noise, as RMS profiles 406 and 408 are likely to appear substantially similar. As ambient noise increases, microphone 132 may be more susceptible to picking up the ambient noise compared to vibration sensor 104, and so height 416 may correspondingly increase. Conversely, as ambient noise decreases, height 416 may decrease. Signal processor 302 may accordingly map height 416 to a SNR for microphone signal 401, which may thus supply SNR estimation 418. The SNR estimation 418 may be compared to predetermined threshold to indicate to selector 304 when to switch between microphone sensor 132 and vibration sensor 104, as will now be described.

Figure 5:
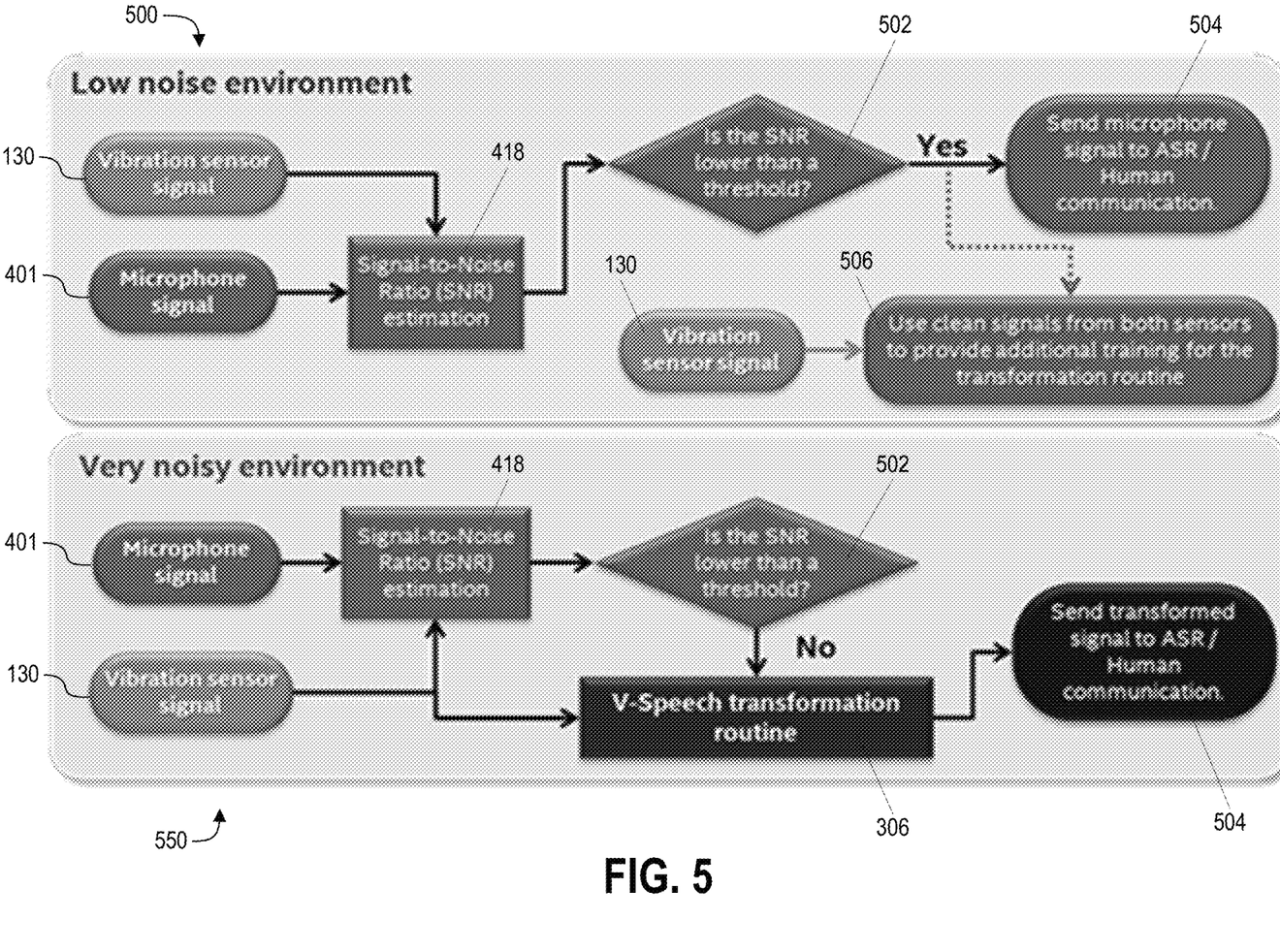
FIG. 5 illustrates signal selection and flow provided by the apparatus of FIG. 3 in low noise and noisy environments, according to some embodiments.

Turning to FIG. 5, the process flows of selector 304 in both a low noise environment 500 and a noisy environment 550 are depicted. Selector 304 may choose between flows for environments 500 and 550 based upon the predetermined threshold. The process flow for both a low noise environment 500 and noisy environment 550 may begin identically: vibration sensor signal 130 and microphone signal 401 may be provided to signal processor 302 to obtain the SNR estimation 418 using both signals. SNR estimation 418 may be compared to the predetermined threshold in operation 502.

If selector 304 in operation 502 determines that the SNR estimation 418 is lower than the predetermined threshold, process flow for low noise environment 500 may then proceed to operation 504, where microphone signal 401 may be supplied to its intended usage, such as ASR module 308. Further, where microphone signal 401 has an SNR estimation 418 that is lower than the predetermined threshold, and so is relatively clean, vibration sensor signal 130 may be utilized to provide clean signals to signal transformation module 306. Transformation module 306 may use a comparison of relatively clean signals from both vibration sensor 104 and microphone sensor 132 to improve its transformation algorithms, so that it can better transform vibration sensor signal 130 to approximate microphone signal 401.

If selector 304 operation 502 determines that the SNR estimation 418 is not lower than the predetermined threshold, viz. it exceeds the predetermined threshold, then process flow for a noisy environment 550 may be followed. Selector 304 may select vibration sensor signal 130, which then may be passed through signal transformation module 306, and then finally to its intended usage in operation 504.

The predetermined threshold may be selected in consideration of factors such as the intended target or use for the signals. More specifically, signal usage may include whether for an ASR module 308, person to person communications, capture and storage for later processing, or other possible uses. Where the signal is to be used with an ASR module 308, a target WER may provide the primary consideration for selecting the predetermined threshold. ASR module 308 may implement various types of ASR routines that, in turn, may have varying levels of WER for a given SNR, and so the selection of the predetermined threshold may depend upon the type of ASR routine implemented by module 308. For example, a robust ASR routine that provides an acceptably low WER with a low SNR may enable a predetermined threshold that allows significantly more ambient noise before switching to signal 130 from vibration sensor 104, compared to a noise-sensitive ASR routine that requires a higher SNR to achieve the same level of WER. To contrast, where the intended use is human to human communication, the predetermined threshold may be selected to allow a lower SNR from microphone 132 than would be tolerated by an ASR routine, with consideration given to intelligibility of the signal by a person, as well as a recipient's tolerance for background noise.

In still other embodiments, multiple predetermined thresholds may be established, to be employed by selector 304 depending upon particular signal usage. For example, apparatus 300 may be signaled that an intended use is ASR module 308, and so selector 304 may employ a first predetermined threshold to achieve a target WER. If apparatus 300 is signaled that the intended use is person to person communications, e.g. a phone call, selector 304 may employ a second, different predetermined threshold that is tuned to provide a signal that is comfortably intelligible to human listeners.

Signal selector 304 may employ hysteresis in some embodiments to switch between signals. Where apparatus 300 implements hysteresis, the predetermined threshold may be split into a first threshold and second threshold. When the microphone signal 401 is currently selected, selector 304 may switch to the vibration sensor signal in response to the SNR being at or above the first predetermined threshold. Likewise, when the vibration sensor signal 130 has been selected, selector 304 may switch to the microphone signal in response to the SNR being below the second predetermined threshold. In keeping with the concept of hysteresis and as will be understood by a person skilled in the relevant art, the second predetermined threshold may typically be lower than the first predetermined threshold. In this way, repeated switching between microphone signal 401 and vibration sensor signal 130 can be avoided in environments where the ambient noise may cause microphone signal 401 to have an SNR that continually fluctuates around the predetermined threshold.

Figure 6:
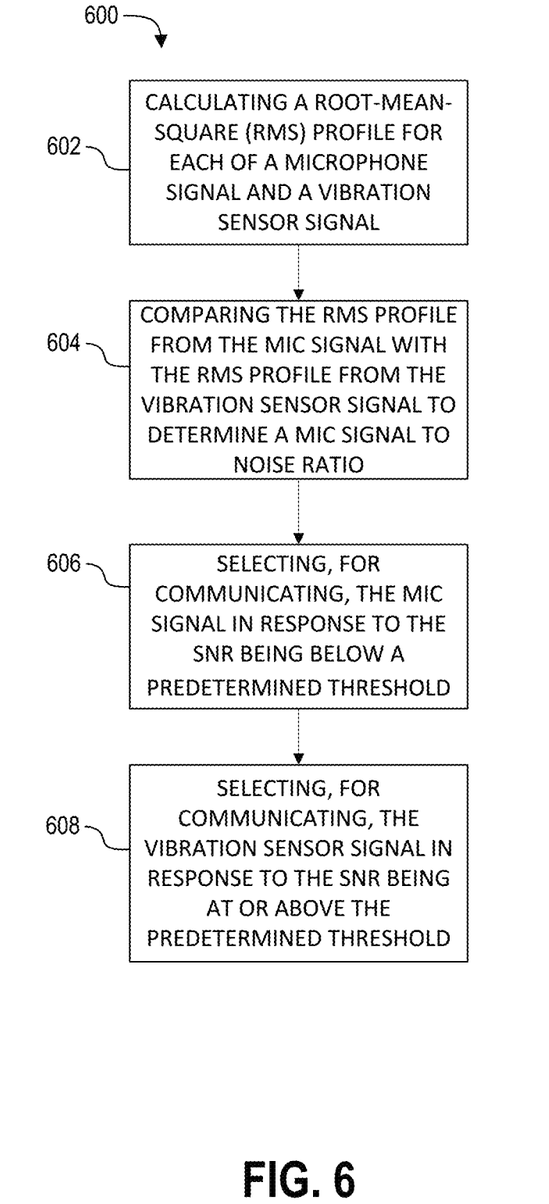
FIG. 6 is a flow chart of the operations of a method for selecting between vibration sensor and microphone signals, according to some embodiments.

FIG. 6 outlines the operations of a method 600 that may be implemented in whole or in part by apparatus 300 or by a computer readable medium with programming instructions for execution on a processor of an apparatus 100, such as a wearable or mobile device. A given implementation may implement one or more operations of method 600. In operation 602, method 600 may include calculating a RMS profile for each of a microphone signal and a vibration sensor signal, as discussed above with reference to FIG. 4. In operation 604, method 600 may include comparing the RMS profile from the microphone signal with the RMS profile from the vibration sensor signal to detect the presence of voice activity. This may include determining a SNR for the microphone signal. In operation 606, method 600 may include selecting, for communicating, the microphone signal in response to the SNR being below the predetermined threshold. In operation 608, method 600 may include selecting, for communicating, the vibration sensor signal in response to the SNR being at or above the predetermined threshold. It will be appreciated that operations 606 and 608 correspond to flows 500 and 550, respectively, as discussed above with reference to FIG. 5.

The present disclosure is described with reference to flow chart illustrations and/or block diagrams of methods, apparatus (systems) and computer program products according to embodiments of the disclosure. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow chart and/or block diagram block or blocks.

The computer program instructions may also be loaded onto a computer or other programmable data processing apparatus to cause a series of operational operations to be performed on the computer or other programmable apparatus to produce a computer implemented process such that the instructions which execute on the computer or other programmable apparatus provide processes for implementing the functions/acts specified in the flow chart and/or block diagram block or blocks.

EXAMPLES

The following examples pertain to further embodiments.

Example 1 is an apparatus, comprising a signal processor to calculate a signal to noise ratio (SNR) for a signal received from a microphone using the microphone signal and a signal received from a vibration sensor, and a selector to select between the microphone signal and the vibration sensor signal for communication, wherein the selector is to select the microphone signal in response to the SNR being below a predetermined threshold, and select the vibration sensor signal in response to the SNR being at or above the predetermined threshold.

Example 2 may include the subject matter of example 1, or any other example herein, wherein the signal processor is to calculate the SNR with calculation of a root-mean-square (RMS) profile for each of the microphone signal and the vibration sensor signal, and comparison of the RMS profile from the microphone signal with the RMS profile from the vibration sensor to determine voice activity.

Example 3 may include the subject matter of example 1 or 2, or any other example herein, wherein the predetermined threshold is a first threshold, and the selector is further to switch to, when the microphone signal has been selected, the vibration sensor signal, in response to the SNR being at or above the first predetermined threshold, and switch to, when the vibration sensor signal has been selected, the microphone signal, in response to the SNR being below a second predetermined threshold, the second predetermined threshold being lower than the first predetermined threshold.

Example 4 may include the subject matter of any of examples 1-3, or any other example herein, wherein to select for communication comprises to use the selected signal for automatic speech recognition (ASR).

Example 5 may include the subject matter of any of examples 1-4, or any other example herein, wherein the selector is further to, on selection of the vibration sensor signal, first process the vibration sensor signal through a transformation routine to approximate the microphone signal before being used for ASR.

Example 6 may include the subject matter of any of examples 1-5, or any other example herein, wherein the apparatus is a wearable device.

Example 7 may include the subject matter of any of examples 1-6, or any other example herein, wherein the apparatus is a head mounted device.

Example 8 may include the subject matter of any of examples 1-7, or any other example herein, wherein the head mounted device is a selected one of a helmet or an eyewear.

Example 9 may include the subject matter of any of examples 1-8, or any other example herein, wherein the vibration sensor comprises a nasal bridge pickup of a smart glasses.

Example 10 may include the subject matter of any of examples 1-8, or any other example herein, wherein the vibration sensor comprises a vibration motor of a mobile device.

Example 11 is a method, comprising calculating a root-mean-square (RMS) profile for each of a microphone signal and a vibration sensor signal, comparing the RMS profile from the microphone signal with the RMS profile from the vibration sensor signal to determine voice activity, and selecting, for communicating, between the microphone signal and the vibration sensor signal in response to a result of the comparing.

Example 12 may include the subject matter of example 11, or any other example herein, wherein the calculating of RMS profiles and comparing are performed to determine a signal-to-noise ratio (SNR) for the microphone signal, and the selecting is based at least in part on the determined SNR.

Example 13 may include the subject matter of example 11 or 12, or any other example herein, wherein the predetermined threshold is a first threshold, and the selecting, for communicating, further comprises switching to, when the microphone signal has been selected, the vibration sensor signal, in response to the SNR being at or above the first predetermined threshold, and switching to, when the vibration sensor signal has been selected, the microphone signal, in response to the SNR being below a second predetermined threshold, the second predetermined threshold being lower than the first predetermined threshold.

Example 14 may include the subject matter of any of examples 11-13, or any other example herein, wherein selecting, for communicating, further comprises using the selected signal for automatic speech recognition (ASR).

Example 15 may include the subject matter of any of examples 11-14, or any other example herein, further comprising, on selection of the vibration sensor signal, first processing the vibration sensor signal through a transformation routine to approximate the microphone signal before using for ASR.

Example 16 is a non-transitory computer-readable medium (CRM) comprising instructions that cause an apparatus, in response to execution by a processor of an apparatus, to calculate a signal to noise ratio (SNR) for a signal received from a microphone using the microphone signal and a signal received from a vibration sensor; select, for communicating, the microphone signal, in response to the SNR being below a predetermined threshold; and select, for communicating, the vibration sensor signal, in response to the SNR being at or above the predetermined threshold.

Example 17 may include the subject matter of example 16, or any other example herein, wherein the instructions are further to cause the apparatus to calculate the SNR with calculation of a root-mean-square (RMS) profile for each of the microphone signal and the vibration sensor signal, and comparison of the RMS profile from the microphone signal with the RMS profile from the vibration sensor to determine voice activity.

Example 18 may include the subject matter of example 16 or 17, or any other example herein, wherein the predetermined threshold is a first threshold, and the instructions are further to cause the apparatus to switch to, when the microphone signal has been selected, the vibration sensor signal, in response to the SNR being at or above the first predetermined threshold, and switch to, when the vibration sensor signal has been selected, the microphone signal, in response to the SNR being below a second predetermined threshold, the second predetermined threshold being lower than the first predetermined threshold.

Example 19 may include the subject matter of any of examples 16-18, or any other example herein, wherein to select for communicating comprises to select for communicating using the selected signal for automatic speech recognition (ASR).

Example 20 may include the subject matter of any of examples 16-19, or any other example herein, wherein the apparatus is further caused to, on selection of the vibration sensor signal, first process the vibration sensor signal through a transformation routine to approximate the microphone signal before being used for ASR.

Example 21 is a system, comprising means for calculating a root-mean-square (RMS) profile for each of a microphone signal and a vibration sensor signal, means for comparing the RMS profile from the microphone signal with the RMS profile from the vibration sensor signal to determine voice activity, and means for selecting between the microphone signal and the vibration sensor signal for communication in response to a result of the comparing.

Example 22 may include the subject matter of example 21, or any other example herein, wherein the means for calculating and the means for comparing are to determine a signal-to-noise ratio for the microphone signal and the vibration sensor signal, and the means for selecting is to select based at least in part on the determined SNR.

Example 23 may include the subject matter of example 21 or 22, or any other example herein, wherein the predetermined threshold is a first threshold, and the means for selecting is further to switch to, when the microphone signal has been selected, the vibration sensor signal, in response to the SNR being at or above the first predetermined threshold, and switch to, when the vibration sensor signal has been selected, the microphone signal, in response to the SNR being below a second predetermined threshold, the second predetermined threshold being lower than the first predetermined threshold.

Example 24 may include the subject matter of any of examples 21-23, or any other example herein, wherein the means for selecting is to use the selected signal for automatic speech recognition (ASR).

Example 25 may include the subject matter of any of examples 21-24, or any other example herein, wherein the means for selecting is further to, on selection of the vibration sensor signal, first process the vibration sensor signal through a transformation routine to approximate the microphone signal before being used for ASR.

Example 26 may include the subject matter of any of examples 11-15, or any other example herein, wherein the method is executed by a wearable device.

Example 27 may include the subject matter of example 26, or any other example herein, wherein the wearable device is a head mounted device.

Example 28 may include the subject matter of example 27, or any other example herein, wherein the head mounted device is a selected one of a helmet or an eyewear.

Example 29 may include the subject matter of any of examples 16-20, or any other example herein, wherein the instructions are to be executed by a wearable device.

Example 30 may include the subject matter of example 29, or any other example herein, wherein the wearable device is a head mounted device.

Example 31 may include the subject matter of example 30, or any other example herein, wherein the head mounted device is a selected one of a helmet or an eyewear.

Example 32 may include the subject matter of any of examples 21-25, or any other example herein, wherein the system comprises a wearable device.

Example 33 may include the subject matter of example 32, or any other example herein, wherein the wearable device is a head mounted device.

Example 34 may include the subject matter of example 33, or any other example herein, wherein the head mounted device is a selected one of a helmet or an eyewear.

Example 35 may include the subject matter of any of examples 11-34, or any other example herein, wherein the vibration sensor comprises a nasal bridge pickup of a smart glasses.

Example 36 may include the subject matter of any of examples 11-34, or any other example herein, wherein the vibration sensor comprises a vibration motor of a mobile device.

Example 37 may include the subject matter of any of examples 1-36, or any other example herein, wherein the microphone comprises a plurality of microphones.

Example 38 may include the subject matter of any of examples 1-37, or any other example herein, wherein the microphone further comprises an array of microphones to implement beam forming.

Example 39 may include the subject matter of any of examples 1-10, wherein either or both of the signal processor and selector may be implemented in hardware.

Example 40 may include the subject matter of any of examples 1-10, wherein either or both of the signal processor and selector may be implemented in software.

What is claimed is:

1. An apparatus, comprising:
    a signal processor to calculate a signal to noise ratio (SNR) using a signal received from a microphone and a signal received from a vibration sensor; and
    a selector to select between the microphone signal and the vibration sensor signal for communication,
    wherein the selector is to select the microphone signal in response to the SNR being below a predetermined threshold, and select the vibration sensor signal in response to the SNR being above the predetermined threshold.

2. The apparatus of claim 1, wherein to calculate the SNR includes:
    calculation of a root-mean-square (RMS) profile for each of the microphone signal and the vibration sensor signal; and
    comparison of the RMS profile from the microphone signal with the RMS profile from the vibration sensor to determine the SNR.

3. The apparatus of claim 1, wherein the predetermined threshold is a first predetermined threshold, and the selector is further to:
    switch to, when the microphone signal has been selected, the vibration sensor signal, in response to the SNR being above the first predetermined threshold; and
    switch to, when the vibration sensor signal has been selected, the microphone signal, in response to the SNR being below a second predetermined threshold, the second predetermined threshold being lower than the first predetermined threshold.

4. The apparatus of claim 1, wherein to select for communication comprises to use the selected signal for automatic speech recognition (ASR).

5. The apparatus of claim 4, wherein the selector is further to, on selection of the vibration sensor signal, first process the vibration sensor signal through a transformation routine to approximate the microphone signal before being used for ASR.

6. The apparatus of claim 1, wherein the apparatus is a wearable device.

7. The apparatus of claim 6, wherein the wearable device is a pair of smart glasses, and the vibration sensor comprises a nasal bridge pickup of the pair& of smart glasses.

8. The apparatus of claim 6, wherein the apparatus is a head mounted device.

9. The apparatus of claim 8, wherein the head mounted device is a helmet.

10. The apparatus of claim 1, wherein the vibration sensor comprises a vibration motor of a mobile device.

11. A method, comprising:
    calculating a root-mean-square (RMS) profile for each of a microphone signal and a vibration sensor signal;
    comparing the RMS profile from the microphone signal with the RMS profile from the vibration sensor signal to determine voice activity; and
    selecting, for communicating, between the microphone signal and the vibration sensor signal in response to a result of the comparing.

12. The method of claim 11, wherein:
    the calculating of RMS profiles and comparing are performed to determine a signal-to-noise ratio (SNR); and
    the selecting is based at least in part on the determined SNR.

13. The method of claim 12, wherein the selecting, for communicating, further comprises:
    switching to, when the microphone signal has been selected, the vibration sensor signal, in response to the SNR being above a first predetermined threshold; and
    switching to, when the vibration sensor signal has been selected, the microphone signal, in response to the SNR being below a second predetermined threshold, the second predetermined threshold being lower than the first predetermined threshold.

14. The method of claim 11, wherein selecting, for communicating, further comprises using the selected signal for automatic speech recognition (ASR).

15. The method of claim 14, further comprising, on selection of the vibration sensor signal, first processing the vibration sensor signal through a transformation routine to approximate the microphone signal before using for ASR.

16. A non-transitory computer-readable medium (CRM) comprising instructions that cause an apparatus, in response to execution by a processor of the apparatus, to:
    calculate a signal to noise ratio (SNR) using a signal received from a microphone and a signal received from a vibration sensor;
    select, for communicating, the microphone signal, in response to the SNR being below a predetermined threshold; and
    select, for communicating, the vibration sensor signal, in response to the SNR being above the predetermined threshold.

17. The CRM of claim 16, wherein the instructions are further to cause the apparatus to calculate the SNR with:
    calculation of a root-mean-square (RMS) profile for each of the microphone signal and the vibration sensor signal; and
    comparison of the RMS profile from the microphone signal with the RMS profile from the vibration sensor to determine the SNR.

18. The CRM of claim 16, wherein the predetermined threshold is a first predetermined threshold, and the instructions are further to cause the apparatus to:
    switch to, when the microphone signal has been selected, the vibration sensor signal, in response to the SNR being above the first predetermined threshold; and
    switch to, when the vibration sensor signal has been selected, the microphone signal, in response to the SNR being below a second predetermined threshold, the second predetermined threshold being lower than the first predetermined threshold.

19. The CRM of claim 16, wherein to select for communicating comprises to select for communicating using the selected signal for automatic speech recognition (ASR).

20. The CRM of claim 19, wherein the apparatus is further caused to, on selection of the vibration sensor signal, first process the vibration sensor signal through a transformation routine to approximate the microphone signal before being used for ASR.

21. A system, comprising:
    means for calculating a root-mean-square (RMS) profile for each of a microphone signal and a vibration sensor signal;
    means for comparing the RMS profile from the microphone signal with the RMS profile from the vibration sensor signal to determine voice activity; and means for selecting between the microphone signal and the vibration sensor signal for communication in response to a result of the comparing.

22. The system of claim 21, wherein:
the means for calculating and the means for comparing are to determine a signal-to-noise ratio (SNR) using the microphone signal and the vibration sensor signal; and
the means for selecting is to select based at least in part on the determined SNR.

23. The system of claim 21, wherein the means for selecting is further to:
switch to, when the microphone signal has been selected, the vibration sensor signal, in response to the SNR being above a first predetermined threshold; and
switch to, when the vibration sensor signal has been selected, the microphone signal, in response to the SNR being below a second predetermined threshold, the second predetermined threshold being lower than the first predetermined threshold.

24. The system of claim 23, wherein the means for selecting is further to switch to, when the microphone signal has been selected, the vibration sensor signal, in response to the SNR being at the first predetermined threshold.

25. The system of claim 21, wherein the means for selecting is to use the selected signal for automatic speech recognition (ASR).

26. The system of claim 25, wherein the means for selecting is further to, on selection of the vibration sensor signal, first process the vibration sensor signal through a transformation routine to approximate the microphone signal before being used for ASR.

* * * * *

UNITED STATES PATENT AND TRADEMARK OFFICE
CERTIFICATE OF CORRECTION

PATENT NO. : 10,847,173 B2
APPLICATION NO. : 15/952177
DATED : November 24, 2020
INVENTOR(S) : Hector Alfonso Cordourier Maruri et al.

It is certified that error appears in the above-identified patent and that said Letters Patent is hereby corrected as shown below:

In the Claims

Column 15
Line 52, "...pair&..." should read – "...pair..."

Signed and Sealed this
Twelfth Day of January, 2021

Andrei Iancu
*Director of the United States Patent and Trademark Office*